A. D. JUDD & E. M. JUDD.
Curtain Fixtures.

No. 137,450. Patented April 1, 1873.

Witnesses
Chas H Smith
Geo. D. Walker

Inventors
Albert D. Judd.
Edward M. Judd.
Lemuel W. Serrell
atty

UNITED STATES PATENT OFFICE.

ALBERT D. JUDD AND EDWARD M. JUDD, OF NEW HAVEN, CONNECTICUT, ASSIGNORS TO HUBERT L. JUDD, OF BROOKLYN, NEW YORK.

IMPROVEMENT IN CURTAIN-FIXTURES.

Specification forming part of Letters Patent No. 137,450, dated April 1, 1873; application filed February 24, 1873.

*To all whom it may concern:*

Be it known that we, ALBERT D. JUDD and EDWARD M. JUDD, of New Haven, in the State of Connecticut, have invented an Improvement in Cord-Tighteners for Curtain-Fixtures, of which the following is a specification:

Cord-tighteners have been made with rack-teeth upon the bar that carries the pulley, and a pawl has been used to retain the rack at any point to which it may be moved.

Our present invention relates to a cord-tightener of the aforesaid general class; and the same consists in a dog that is made with a tooth to take the rack-teeth; a lever, by which to move the dog; and a lip and recess whereby the dog is connected with a strap or loop, through which the rack slides. By this construction the dog can be cast separately from the loop and bar, and there will not be any expense in putting the parts together. The pulley is secured upon a boss or hub projecting from the rack-bar, and it is held by a rivet or screw. By this construction the strain upon the rivet is lessened and the pulley will not revolve too freely.

Figure 1:
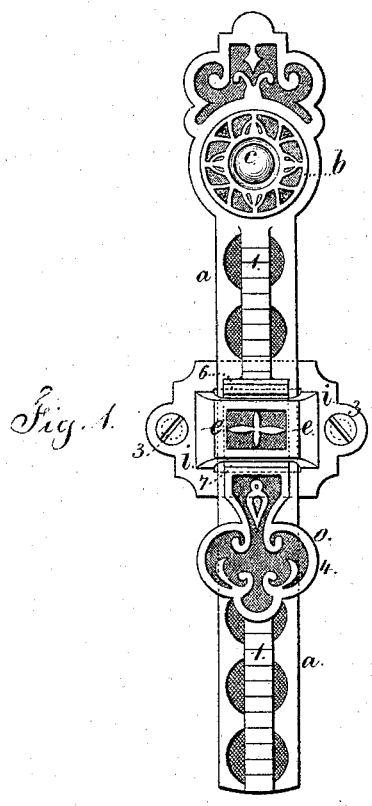
Figure 2:
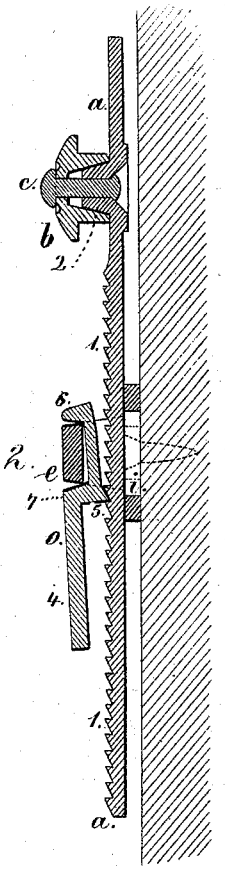
Figure 3:
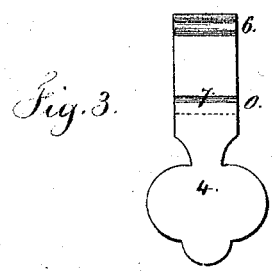
Figure 4:
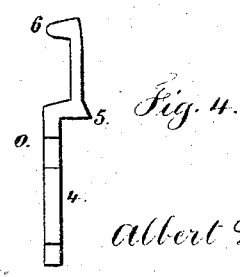

In the drawing, Figure 1 is an elevation of the cord-tightener. Fig. 2 is a vertical section of the same, and Figs. 3 and 4 are detached views of the dog.

The rack $a$ is made with teeth 1 and a projecting hub or boss, 2, around which is the pulley $b$, said pulley having a cavity sufficient to freely contain said boss. The screw or rivet $c$ secures the pulley in place. The strain of the cord around the pulley comes against this boss, and but little upon the rivet, and the friction of the parts is sufficient to prevent the pulley turning too freely. The rack $a$ moves freely through the loop $e$, that is cast with a back plate, $i$, having holes 3 for nails or screws, by which the parts are attached to the window-casing. Between the loop $e$ and rack $a$ the dog $o$ is introduced, having a lever end, 4, a tooth, 5, to take the rack-teeth 1, and a lip, 6, to keep the dog in place, the lip 6 and shoulder 7 producing a recess for the loop $e$.

It will now be evident that the parts can be cast separately with great facility, and that the dog $o$ is to be entered beneath the loop $e$, and then the rack $a$ inserted; the dog then cannot fall out, but its tooth 5 will hold the rack-teeth and rack at whatever point the rack may be moved to in stretching the cord.

We claim as our invention—

1. The dog $o$, made with the lever end 4, tooth 5, and lip 6, in combination with the loop $e$ and rack $a$, substantially as set forth.

2. The boss 2 upon the rack-bar $a$, around which the pulley $b$ revolves and into which boss the rivet or screw $c$ passes, as set forth.

Signed by us this 18th day of February, A. D. 1873.

A. D. JUDD.
E. M. JUDD.

Witnesses:
C. A. WEBB,
G. F. MOORE.